2,837,535

1-ACYLTHIO SUBSTITUTION PRODUCTS OF 17a-OXA-D-HOMO-4-ANDROSTENE-3,17-DIONE

Raymond M. Dodson, Park Ridge, and Robert C. Tweit, Wilmette, Ill., assignors to G. D. Searle & Co., Chicago, Ill., a corporation of Delaware No Drawing. Application January 16, 1957
Serial No. 634,419

3 Claims. (Cl. 260—343.2)

The present invention is concerned with 1-acylthio substitution products of 17a-oxa-D-homo-4-androstene-3,17-dione. The compositions of this invention can be represented by the general structural formula

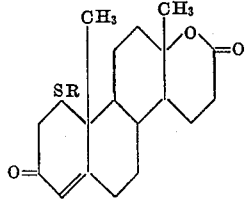

in which formula R represents a lower alkanoyl radical. Among the lower alkanoyl radicals which R can represent are formyl, acetyl, propionyl, butyryl, valeryl, hexanoyl, heptanoyl, octanoyl and branched-chain isomers thereof, said alkanoyl radicals being the acyl radicals of alkanoic acids containing fewer than 9 carbon atoms.

Compositions of the present invention can be prepared by the addition of a thioalkanoic acid of the structural formula

R'COSH wherein R' represents hydrogen or a lower alkyl radical, to 17a-oxa-D-homo-1,4-androstadiene-3,17-dione which has the structural formula

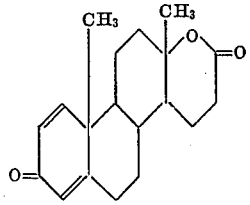

This compound is also known as 2,4b-dimethyl-2-hydroxy-7-oxa-1,2,3,4,4a,4b,7,9,10,10a-decahydrophenanthrene-1-propionic acid lactone and as 1-dehydrotestololactone. The addition reaction proceeds fairly rapidly at elevated temperatures, such as those in excess of 50° C., and can optionally be carried out under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, preceded, where necessary, by removal of excess thioalkanoic acid.

The free mercaptan, 3,17-dioxo-17a-oxa-D-homo-4-androstene-1-thiol, can be obtained by the mild hydrolysis of the acylthio derivatives.

The addition of thioalkanoic acids to the 1,2-double bond of the starting material employed in the practice of this invention proceeds under steric influences such that of the stereoisomers formed, one is obtained in predominant amount. The isomer obtained in predominant amount has in each case been characterized herein as possessing the alpha configuration of the 1-acylthio group. This configuration has been designated in order to provide a more complete exposition of the present invention, and in order that the specification shall constitute a more useful contribution to the art. However, the designated configuration of the 1-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention have useful pharmacological properties, in consequence of their hormonal and anti-hormonal actions. Thus, they exhibit selective anti-cortisone action. As a specific example of their use, they can be administered with cortisone to inhibit the ability of cortisone to promote a Coxsackie virus infection. Another aspect of their anti-hormonal activity is shown by their effectiveness in inhibiting the localized and secondary effects of androgens such as testosterone. These compounds are also agents which are useful in the treatment of traumatic shock.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrade (° C.) and quantities of materials in parts by weight.

Example 1

A stirred suspension of 1.24 parts of 17a-oxa-D-homo-1,4-androstadiene-3,17-dione in 3 parts of thioacetic acid is heated under reflux for 6 hours and then allowed to stand at room temperature for about 18 hours. The solid product which is present at the end of the reaction period is collected on a filter and washed with ether. This compound is 1α-acetylthio-17a-oxa-D-homo-4-androstene-3,17-dione which melts with decomposition at about 215–216° C. and has a specific rotation of about +53° in chloroform solution. The structural formula is

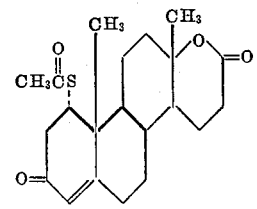

Example 2

One part of 17a-oxa-D-homo-1,4-androstadiene-3,17-dione is mixed with 2 parts of thiopropionic acid, and the mixture is stirred and heated at about 90–100° C. for 2 hours. During the heating period all of the starting material dissolves and a clear solution results. The reaction mixture is maintained at about 25° C. for an additional 20 hours, and is then distilled almost to dryness under reduced pressure. The crystalline residue is collected and washed with ether. It is 1α-propionylthio-17a-oxa-D-homo-4-androstene-3,17-dione which melts with decomposition at about 190.5–191.5° C. and has the structural formula

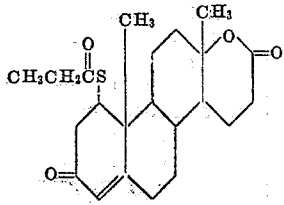

What is claimed is:
1. A compound of the structural formula

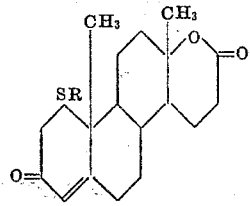

wherein R is a lower alkanoyl radical.
2. 1α-acetylthio-17a - oxa - D - homo - 4 - androstene-3,17-dione.
3. 1α-propionylthio-17a-oxa-D - homo - 4 - androstene-3,17-dione.

No references cited.